(12) United States Patent
Wang et al.

(10) Patent No.: US 11,397,839 B2
(45) Date of Patent: Jul. 26, 2022

(54) METHOD OF PARTICLE SIZE DISTRIBUTION OF PARTICULATE BRIDGING LOST CIRCULATION MATERIALS FOR FRACTURED LEAKAGE

(71) Applicant: Southwest Petroleum University, Chengdu (CN)

(72) Inventors: Gui Wang, Chengdu (CN); Shengjiang Xu, Chengdu (CN); Xiaolin Pu, Chengdu (CN); Hu Jia, Chengdu (CN); Tianshou Ma, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 251 days.

(21) Appl. No.: 16/897,282

(22) Filed: Jun. 10, 2020

(65) Prior Publication Data

US 2020/0394350 A1 Dec. 17, 2020

(30) Foreign Application Priority Data

Jun. 12, 2019 (CN) .......................... 201910506362.0

(51) Int. Cl.
*G06F 30/25* (2020.01)
*G06F 30/17* (2020.01)
(Continued)

(52) U.S. Cl.
CPC ............. *G06F 30/25* (2020.01); *G01N 15/02* (2013.01); *G06F 30/17* (2020.01); *G06F 2111/10* (2020.01)

(58) Field of Classification Search
CPC ...... G06F 30/25; G06F 30/17; G06F 2111/10; G01N 15/02; G01N 15/0288
(Continued)

(56) References Cited

U.S. PATENT DOCUMENTS 9,038,718 B1 * 5/2015 Karimi .................. E21B 33/138
166/278
2010/0313459 A1 * 12/2010 Gomez .................. F41A 17/72
42/70.08
(Continued)

FOREIGN PATENT DOCUMENTS

CN 102590888 A * 7/2012
CN 102590888 B * 4/2014
(Continued)

OTHER PUBLICATIONS

Jillavenkatesa et al., "Particle Size Characterization", NIST Recommended Practice Guide, Special Publication 960-1, Jan. 2001, 167 pages. (Year: 2001).*

*Primary Examiner* — Phallaka Kik
(74) *Attorney, Agent, or Firm* — Bayramoglu Law Offices LLC (57) ABSTRACT

A method of designing a particle size distribution of particulate bridging lost circulation material for a fractured leakage includes the following steps: classifying the lost circulation materials according to a particle size; calculating an expected range of a characteristic particle size of the lost circulation materials according to a fracture width and particle size selection criteria; setting a relative percentage content of the each level of the lost circulation materials; using a particle size distribution function to fit a particle size distribution curve; calculating the characteristic particle size of the lost circulation materials according to the particle size distribution curve; determining whether the calculated characteristic particle size conforms to the expected range of the characteristic particle size; and generating the particle size distribution of the lost circulation materials conforming to the particle size selection criteria.

3 Claims, 6 Drawing Sheets

(51) Int. Cl.
*G01N 15/02* (2006.01)
*G06F 111/10* (2020.01)

(58) Field of Classification Search
USPC ..................................... 702/128; 703/2, 7, 6
See application file for complete search history.

(56) References Cited

U.S. PATENT DOCUMENTS

2012/0108472 A1* 5/2012 Wu .................. C09K 8/035
507/112
2014/0290943 A1* 10/2014 Ladva ............... E21B 43/267
166/69
2014/0374110 A1* 12/2014 Wu .................. C09K 8/508
166/310

FOREIGN PATENT DOCUMENTS

| CN | 107642348 A | * | 1/2018 | |
| CN | 107795303 A | * | 3/2018 | |
| CN | 108316915 A | * | 7/2018 | ............. E21B 43/26 |
| CN | 109267985 A | * | 1/2019 | ............. E21B 43/26 |

* cited by examiner

METHOD OF PARTICLE SIZE DISTRIBUTION OF PARTICULATE BRIDGING LOST CIRCULATION MATERIALS FOR FRACTURED LEAKAGE

CROSS REFERENCE TO THE RELATED APPLICATIONS

This application is based upon and claims priority to Chinese Patent Application No. 201910506362.0, filed on Jun. 12, 2019, the entire contents of which are incorporated herein by reference.

TECHNICAL FIELD

The present invention relates to a design method of a particle size distribution of particulate bridging lost circulation materials for a fractured leakage, which belongs to the field of petroleum engineering drilling.

BACKGROUND

Lost circulation is one of the common downhole complex problems during drilling, and may cause a series of consequences such as loss of expensive drilling fluids, non-operating time, wellbore destabilization, and even blowout which is a more serious accident than the lost circulation itself. According to different formations, lost circulation is generally divided into three categories: permeable leakage, fractured leakage and karst leakage, among which the fractured leakage is the most common and most difficult to solve. The fractured leakage not only causes a great deal of drilling fluid waste and increases the drilling cost, but also prolongs the construction period of oil and gas wells, which seriously hinders the exploration and development process of oil and gas resources.

The commonly used plugging methods include bridge plugging, cement plugging and chemical gel plugging. Among them, bridge plugging has the broadest application due to its inexpensive material price, extensive source, and simple construction process. The bridging plugging process comprises mixing the material for bridging and filling into the base slurry to form the plugging slurry. The plugging slurry is injected into the leakage formation by the slurry pump and enters into the leakage formation under the action of pressure difference. If the size of particulate bridging material matches the size of the fracture, then the fracture is "stuck" and can be changed into a pore to block the subsequent inflow of particulate bridging and filling material, and the particulate bridging material further accumulates to form the plugging section, which prevents or retards the leakage of drilling fluids to the deep part of the formation.

The core idea of bridge plugging is to design reasonable particle size and particle size distribution of lost circulation materials. Scholars at home and abroad have done a lot of research and put forward a number of particle size design theories and methods for particulate lost circulation materials. Common design theories and methods are as follows: one-third median pore size bridging theory (Abrams, 1977), ideal filling theory (Andreasen and Anderson, 1930), temporary shielding plugging (Pingya Luo, Xiangdong Luo, et al., 1992), D90 method (Hands, et al., 1998), Vickers method (Vickers, et al., 2006), D50 method (Whitfill, et al., 2008), etc. However, the design criteria of lost circulation material in the prior art are not ideal for fractured leakage in practical application. On the one hand, the existing design methods of particle size distribution of particulate bridging lost circulation materials for fractured leakage mostly directly apply the particle size design method of porous lost circulation material, which is poorly adapted to the fractured leakage; on the other hand, the design methods for particle size distribution of lost circulation materials for fractured leakage are based on the traditional experiments of short fractured plates. The essence of the design methods differ greatly, which ultimately leads to an unsatisfactory bridging plugging effect for fractured leakage.

In order to make the operation of bridge plugging for fractured leakage more scientific and successful, and to facilitate the formulation of bridging lost circulation material for fractured leakage, it is urgent to put forward a design method of a particle size distribution of particulate bridging lost circulation materials for fractured leakage.

SUMMARY

In order to overcome the shortcomings in the prior art, the present invention provides a design method of particle size distribution of particulate bridging lost circulation material for fractured leakage, which can ensure that the particulate lost circulation material enters into the fracture to form a stable plugging interlayer with high compactness.

The present invention provides a technical proposal for solving the above technical problems as follows. A design method of particle size distribution of particulate bridging lost circulation materials for fractured leakage includes the following steps:

step S10: classifying the lost circulation materials according to a particle size;

step S20: calculating an expected range of a characteristic particle size of the lost circulation materials according to a fracture width and particle size selection criteria; wherein the particle size selection criteria are as follows:

$$R = \frac{D90}{W_i} = 0.5 - 0.71$$

$$D10 = 0.1 - 0.2$$

$$S = \frac{D90 - D10}{D50} \geq 1.5$$

where, R is a ratio of the characteristic particle size to the fracture width; $W_i$ is the fracture width; S is a relative span of the particle size distribution; D10 is a sieving particle size corresponding to 10% on a cumulative distribution curve of the lost circulation materials; D50 is a sieving particle size corresponding to 50% on the cumulative distribution curve of the lost circulation materials; D90 is a sieving particle size corresponding to 90% on the cumulative distribution curve of the lost circulation materials;

step S30: according to each level of the lost circulation materials after being classified in step S10, setting a relative percentage content $\omega_1$-$\omega_n$ of the each level of the lost circulation materials;

step S40: using a particle size distribution function to fit a particle size distribution curve;

step S50: calculating the characteristic particle size of the lost circulation materials according to the particle size distribution curve;

step S60: determining whether the calculated characteristic particle size conforms to the expected range of the characteristic particle size calculated in step S20, if yes, proceeding to the next step; if not, resetting the relative percentage content of the each level of the lost circulation material, and repeating steps S20-S60 until the calculated characteristic particle size conforms to the expected range of the characteristic particle size calculated in step S20; and step S70: finally generating the particle size distribution of the lost circulation materials conforming to the particle size selection criteria.

Further, the classification process in step S10 is as follows:

a lost circulation material with a particle size of less than 0.1 and a mesh number of larger than 150 is classified as level A lost circulation material;

a lost circulation material with a particle size of 0.1-0.2 and a mesh number of 80-150 is classified as level B lost circulation material;

a lost circulation material with a particle size of 0.2-0.45 and a mesh number of 40-80 is classified as level C lost circulation material;

a lost circulation material with a particle size of 0.45-0.9 and a mesh number of 20-40 is classified as level D lost circulation material;

a lost circulation material with a particle size of 0.9-1.4 and a mesh number of 14-20 is classified as level E lost circulation material;

a lost circulation material with a particle size of 1.4-1.6 and a mesh number of 12-14 is classified as level F lost circulation material;

a lost circulation material with a particle size of 1.6-2.0 and a mesh number of 10-12 is classified as level G lost circulation material;

a lost circulation material with a particle size of 2.0-2.5 and a mesh number of 8-10 is classified as level H lost circulation material; and a lost circulation material with a particle size of larger than 2.5 and a mesh number of less than 8 is classified as level I lost circulation material.

Further, the sum of the relative percentage content of the each level of the lost circulation material in step S30 is 100.

The advantages of the present invention are as follows. The present invention can ensure that the particulate lost circulation material enters into the fracture to form a stable plugging interlayer with high compactness, which is suitable for the bridging plugging technology of the fractured formation leakage, with clear physical significance and easy engineering operation.

DETAILED DESCRIPTION OF THE EMBODIMENTS

The present invention is further described in combination with the embodiments and the drawings.

Figure 11:
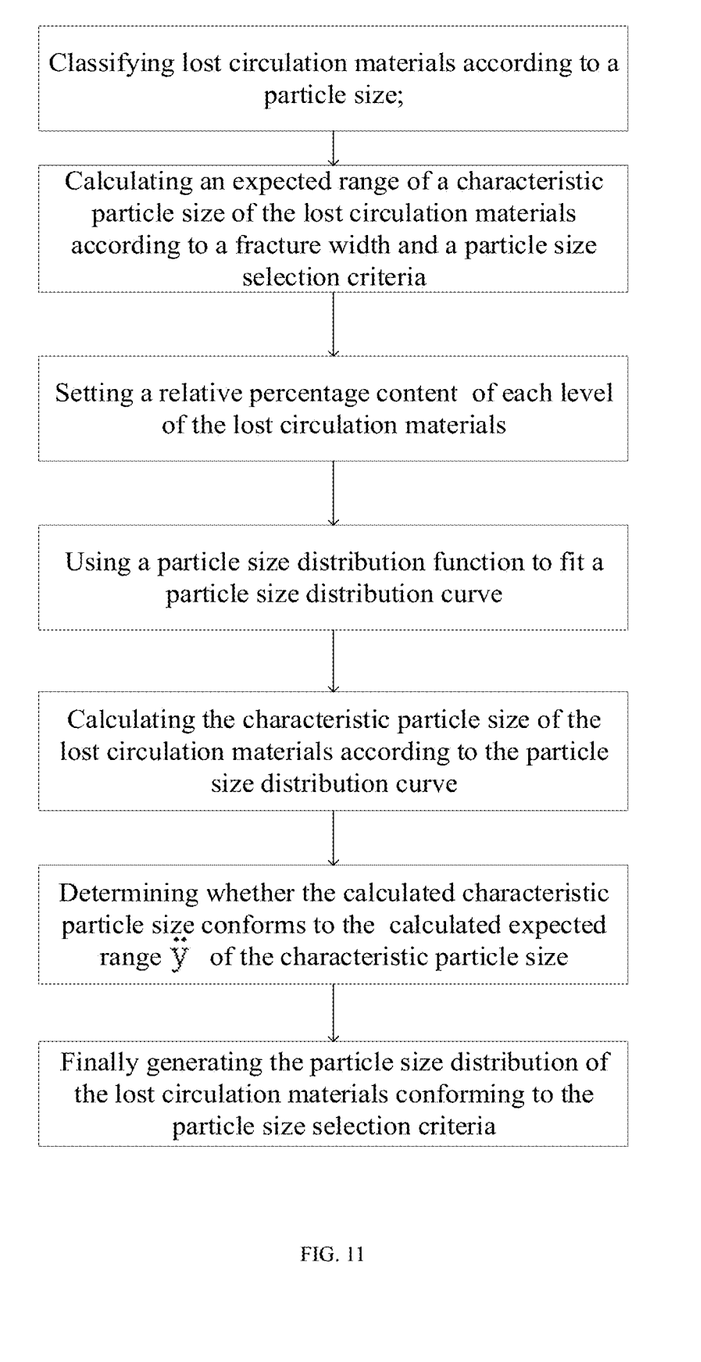
FIG. 11 is a flow chart of the present invention.

As shown in FIG. 11, according to the present invention, a design method of particle size distribution of particulate bridging lost circulation material for fractured leakage includes the following steps:

Step S10: the particle size of the particulate lost circulation material is represented by the sieving particle size of the square-hole sieve, and the particulate lost circulation material is classified according to the sieving particle size, as shown in Table 1.

TABLE 1

| classification of particulate lost circulation materials according to sieving particle size | | | | | | | | | |
|---|---|---|---|---|---|---|---|---|---|
| Level | A | B | C | D | E | F | G | H | I |
| Mesh number | >150 | 80-150 | 80-40 | 40-20 | 20-14 | 14-12 | 12-10 | 10-8 | <8 |
| mm | <0.1 | 0.1-0.2 | 0.2-0.45 | 0.45-0.9 | 0.9-1.4 | 1.4-1.6 | 1.6-2.0 | 2.0-2.5 | >2.5 |

Step S20: The expected range of characteristic particle sizes D10, D50 and D90 of the lost circulation material is calculated according to the fracture width and the particle size selection criteria, and the particle size selection criteria are as follows:

$$R = \frac{D90}{W_i} = 0.5 - 0.71 \quad (1)$$

$$D10 = 0.1 - 0.2 \quad (2)$$

$$S = \frac{D90 - D10}{D50} \geq 1.5 \quad (3)$$

where, R is the ratio of the characteristic particle size to the fracture width; $W_i$ is the fracture width; S is the relative span of particle size distribution; D10 is the sieving particle size corresponding to 10% on the cumulative distribution curve of the lost circulation material; D50 is the sieving particle size corresponding to 50% on the cumulative distribution curve of the lost circulation material; D90 is the sieving particle size corresponding to 90% on the cumulative distribution curve of the lost circulation material;

Criterion (1) indicates that the lost circulation material should not contain too many particles with larger particle size, so as to ensure that most of the lost circulation material can enter into the fracture smoothly and to prevent the lost circulation material from being blocked outside the fracture inlet (often referred to as "sealing door"), thereby avoiding the false appearance of successful plugging, which in fact due to the damage of scouring of drilling fluid and the vibration and collision of drilling tools to the plugging layer outside the fracture inlet;

Criterion (2) indicates that the lost circulation material must contain enough fine particles with particle size less than 0.2 mm to ensure that the pores of the plugging layer can be filled with enough fine particles after the fracture is built with the bridge to become the pores.

Criterion (3) indicates that the relative range of the particle size distribution of the lost circulation material must be wide enough, so as to include particles with reasonable sizes in the lost circulation material, and to avoid the excessively large pore of the plugging layer. In this way, the lost circulation material can form a dense plugging layer in the fracture, so as to reduce the amount of leakage fluid, and improve the success rate of plugging.

Step S30: the relative percentage content $\omega_1$-$\omega_n$ of each level of the circulation material is set according to the each level of the lost circulation material after being classified in step S10, wherein $\omega_1+\omega_2+\omega_3+L\ \omega_n=100$.

Step S40: the particle size distribution function is adopted to fit the particle size distribution curve of each level of the lost circulation material after the above settings;

The following functions are adopted to fit the cumulative particle size distribution curve of the particles:

(1) Rosin-Rammler Distribution Function $$F(D) = 100 - 100\exp\left[-\left(\frac{D}{D_{50}}\right)^n\right]$$

(2) Normal Distribution Function $$F(D) = \frac{1}{\sqrt{2\pi}\,\sigma_g} \int_{D_{min}}^{D} \exp\left[-\frac{(D-D_g)^2}{2\sigma_g^2}\right] g dD$$

(3) Lognormal Distribution Function $$F(\ln D) = \frac{1}{\sqrt{2\pi}\ln\sigma_g} \int_{D_{min}}^{D} \exp\left[-\frac{(\ln D - \ln D_g)^2}{2\ln\sigma_g^2}\right] g d(\ln D)$$

where, Dg is the geometric mean diameter, and σg is the geometric standard deviation.

Step S50: the values of characteristic particle sizes D10, D50 and D90 of the lost circulation material are calculated according to the particle size distribution curve.

Step S60: the calculated values of characteristic particle sizes are determined whether to conform to the expected range of the characteristic particle sizes calculated in step S20 or not, if yes, proceeding to the next step; if not, resetting the relative percentage content of each level of the lost circulation material, and repeating steps S20-S60 until the calculated values of characteristic particle sizes conform to the expected range of the characteristic particle sizes calculated in step S20.

Step S70: finally, the particle size distribution of the lost circulation material conforming to the particle size selection criteria is generated.

Embodiment 1

Figure 1:
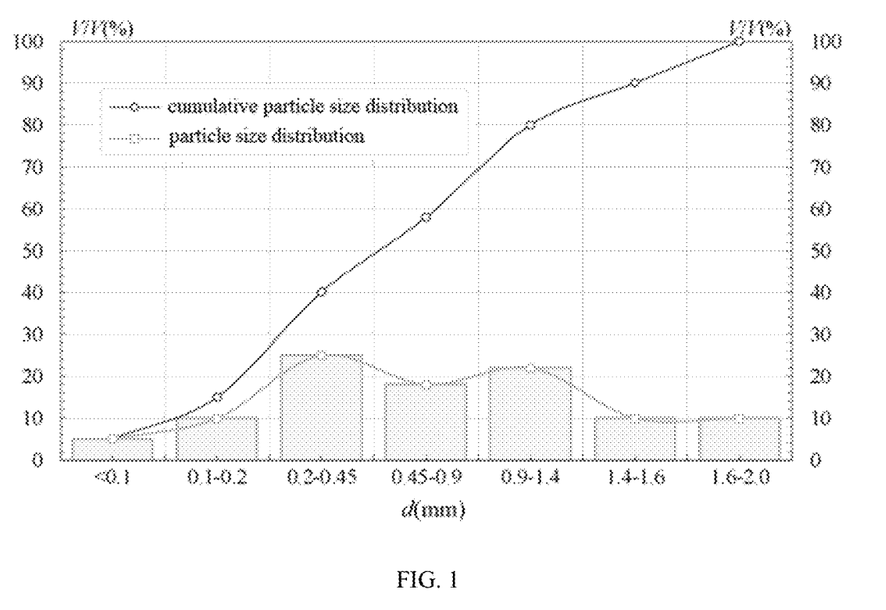
FIG. 1 is a schematic diagram showing the particle size distribution curve and cumulative particle size distribution curve of the particles according to Embodiment 1.

The fracture widths are obtained as $W_i=3$ and $W_o=2$; the expected range of D10, D50, D90 is calculated according to the fracture widths and the above particle size selection criteria; then, based on 100 weight parts of lost circulation material, the weight ratio of level A-G lost circulation materials is 5:10:25:18:22:10:10, and the level A-G lost circulation materials are mixed to form the bridging lost circulation material S1. FIG. 1 is a schematic diagram showing the particle size distribution curve and cumulative particle size distribution curve of the lost circulation material S1. According to the cumulative particle size distribution curve of the lost circulation material and the particle size distribution function, the characteristic particle sizes D10, D50 and D90 of lost circulation material are calculated as 0.15, 0.69 and 1.59, respectively, which are all within the expected range.

Based on 100 weight parts of lost circulation base slurry, 200 weight parts of the bridging lost circulation material are adopted, and the high-temperature high-pressure dynamic and static lost circulation simulator is employed to test its plugging effect on the fracture. The test result are shown in Table 2.

Embodiment 2

Figure 2:
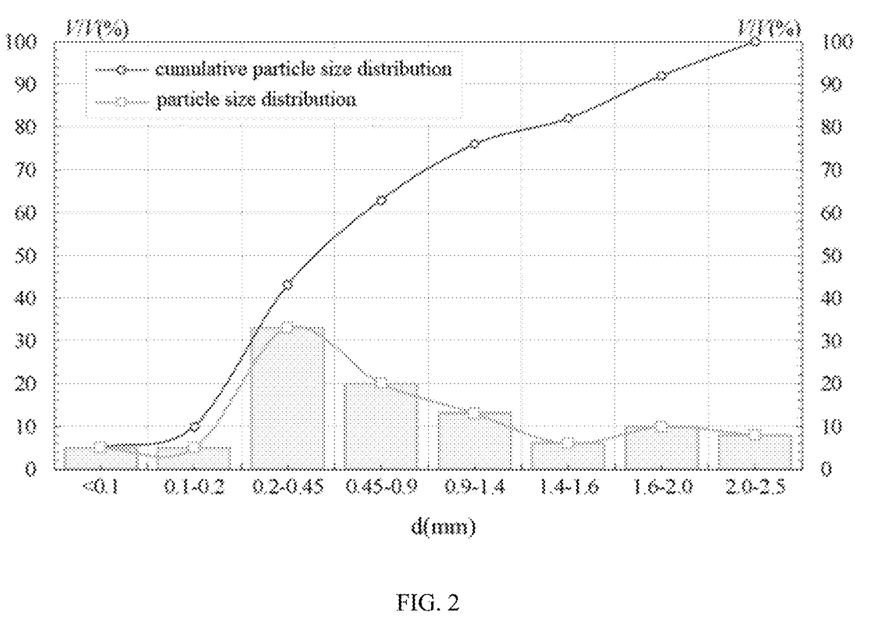
FIG. 2 is a schematic diagram showing the particle size distribution curve and cumulative particle size distribution curve of the particles according to Embodiment 2.

The fracture widths and test method in Embodiment 2 are the same as those in Embodiment 1. The difference is as follow: in Embodiment 2, the weight ratio of level A-H lost circulation materials is set as 5:5:33:20:13:6:10:8, and the level A-H lost circulation materials are mixed to form the bridging lost circulation material S2. FIG. 2 is a schematic diagram showing the particle size distribution curve and cumulative particle size distribution curve of the lost circulation material S2. According to the cumulative distribution curve of the lost circulation material and the particle size distribution function, the characteristic particle sizes D10, D50 and D90 of the lost circulation material are calculated as 0.2, 0.53 and 1.89, respectively, which are all within the expected range.

Embodiment 3

Figure 3:
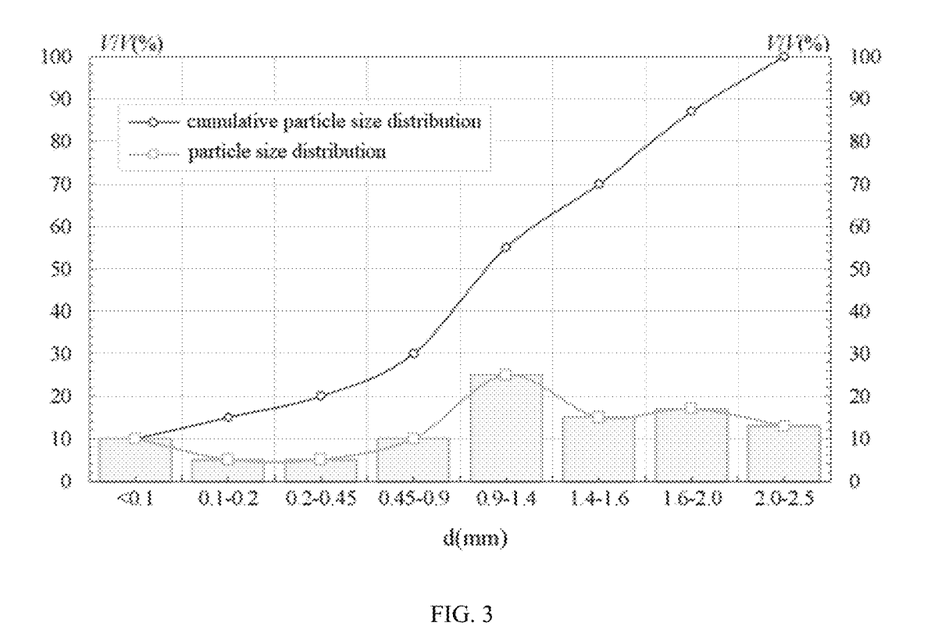
FIG. 3 is a schematic diagram showing the particle size distribution curve and cumulative particle size distribution curve of the particles according to Embodiment 3.

The fracture widths and test method in Embodiment 3 are the same as those in Embodiment 1. The difference is as follow: in Embodiment 3, the weight ratio of level A-H lost circulation materials is set as 10:5:5:10:25:15:17:13, and the level A-H lost circulation materials are mixed to form the bridging lost circulation material S3. FIG. 3 is a schematic diagram showing the particle size distribution curve and cumulative particle size distribution curve of the lost circulation material S3. According to the cumulative distribution curve of lost circulation material and the particle size distribution function, the characteristic particle sizes D10, D50 and D90 of the lost circulation material are calculated as 0.1, 1.33 and 2.1, respectively, which are all within the expected range.

Embodiment 4

Figure 4:
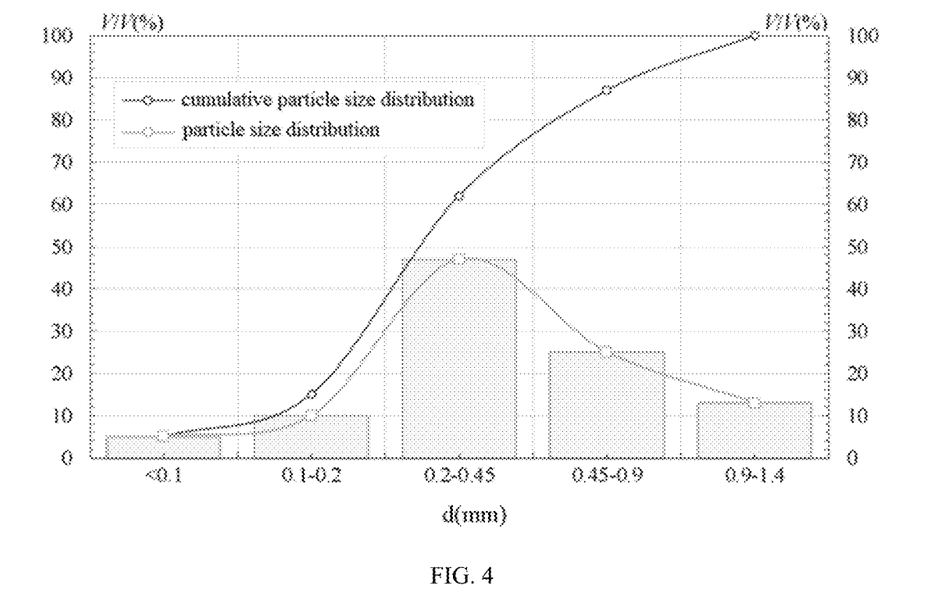
FIG. 4 is a schematic diagram showing the particle size distribution curve and cumulative particle size distribution curve of the particles according to Embodiment 4.

The test method in Embodiment 4 is the same as that in Embodiment 1. The difference is as follows: in Embodiment 4, the fracture widths are $W_i=2$ and $W_o=1$, and the expected range of D10, D50 and D90 is calculated according to the fracture widths and the particle size selection criteria; the weight ratio of level A-E lost circulation materials is set as 5:10:47:25:13, and the level A-E lost circulation materials are mixed to form the bridging lost circulation material S4. FIG. 4 is a schematic diagram showing the particle size distribution curve and cumulative particle size distribution curve of the lost circulation material S4. According to the cumulative distribution curve of the lost circulation material and the particle size distribution function, the characteristic particle sizes D10, D50 and D90 of the lost circulation material are calculated as 0.15, 0.35 and 1, respectively, which are all within the expected range.

Embodiment 5

Figure 5:
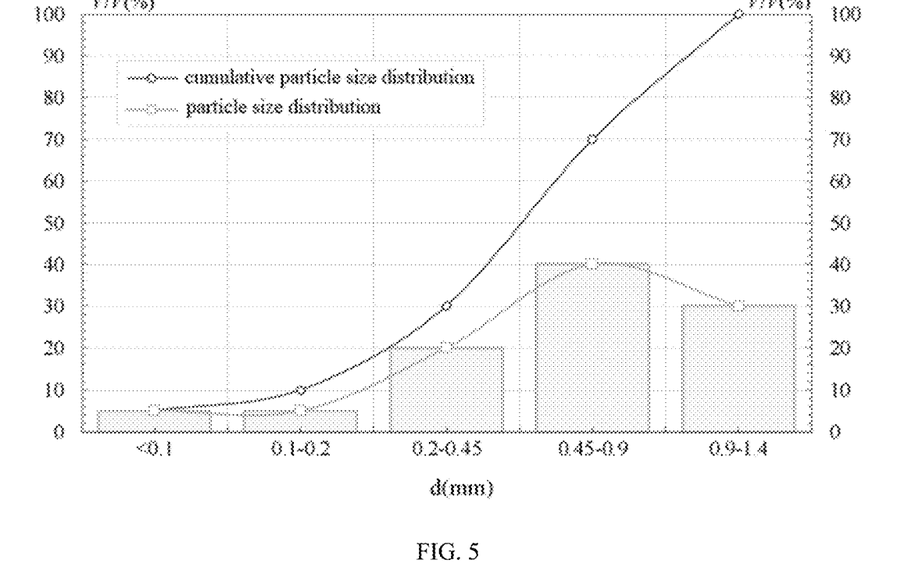
FIG. 5 is a schematic diagram showing the particle size distribution curve and cumulative particle size distribution curve of the particles according to Embodiment 5.

The fracture widths and test method in Embodiment 5 are the same as those in Embodiment 4. The difference is as follow: in Embodiment 5, the weight ratio of level A-E lost circulation materials is set as 5:5:20:40:30, and the level A-E lost circulation materials are mixed to form the bridging lost circulation material S5. FIG. 5 is a schematic diagram showing the particle size distribution curve and cumulative particle size distribution curve of the lost circulation material S5. According to the cumulative distribution curve of the lost circulation material and the particle size distribution function, the characteristic particle sizes D10, D50 and D90 of the lost circulation material are calculated as 0.2, 0.62 and 1.22, respectively, which are all within the expected range.

Embodiment 6

Figure 6:
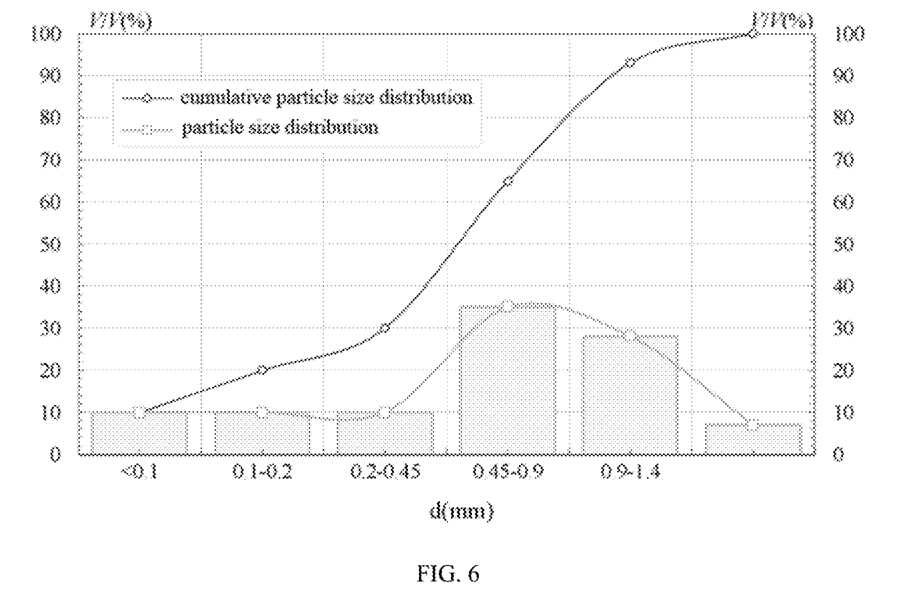
FIG. 6 is a schematic diagram showing the particle size distribution curve and cumulative particle size distribution curve of the particles according to Embodiment 6.

The fracture widths and test method in Embodiment 6 are the same as those in Embodiment 4. The difference is as follow: in Embodiment 6, the weight ratio of level A-F lost circulation materials is set as 10:10:10:35:28:7, and the level A-F lost circulation materials are mixed to form the bridging lost circulation material S6. FIG. 6 is a schematic diagram showing the particle size distribution curve and cumulative particle size distribution curve of the lost circulation material S6. According to the cumulative distribution curve of the lost circulation material and the particle size distribution function, the characteristic particle sizes D10, D50 and D90 of the lost circulation material are calculated as 0.1, 0.70 and 1.36, respectively, which are all within the expected range.

Comparative Example 1

Figure 7:
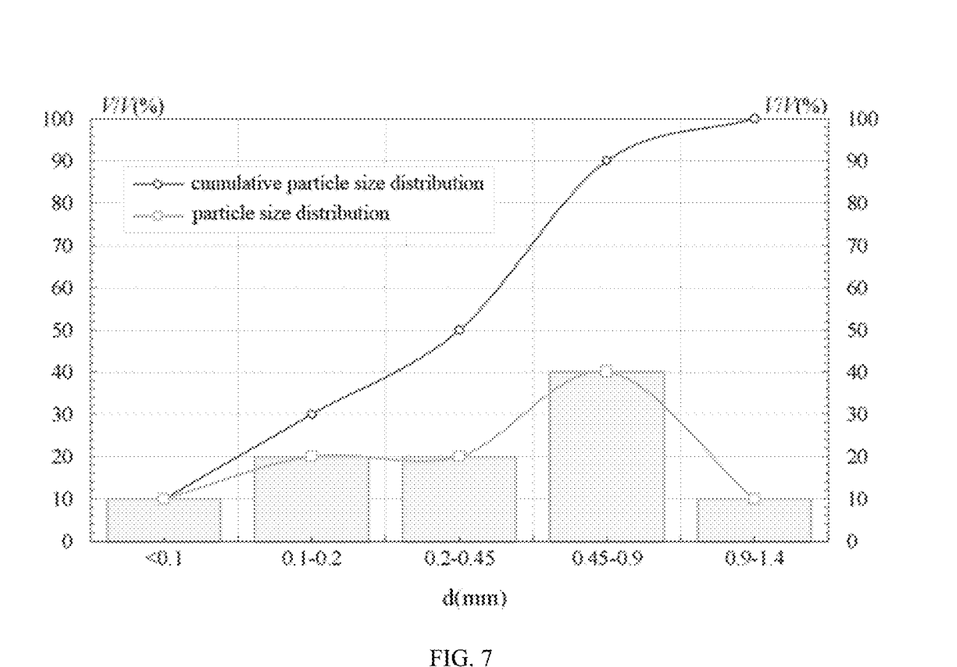
FIG. 7 is a schematic diagram showing the particle size distribution curve and cumulative particle size distribution curve of the particles according to Comparative Example 1.

The fracture widths, the preparation and test method of the lost circulation material in Comparative Example 1 are the same as those in Embodiment 4. The difference is as follows: in Comparative Example 1, the weight ratio of level A-E lost circulation materials is set as 10:20:20:40:10, and the level A-E lost circulation materials are mixed to form the bridging lost circulation material D1. FIG. 7 is a schematic diagram showing the particle size distribution curve and cumulative particle size distribution curve of the lost circulation material D1. According to the cumulative distribution curve of the lost circulation material and the particle size distribution function, the characteristic particle sizes D10, D50 and D90 of the lost circulation material are calculated as 0.1, 0.44 and 0.9, respectively, which are not in the expected range.

Comparative Example 2

Figure 8:
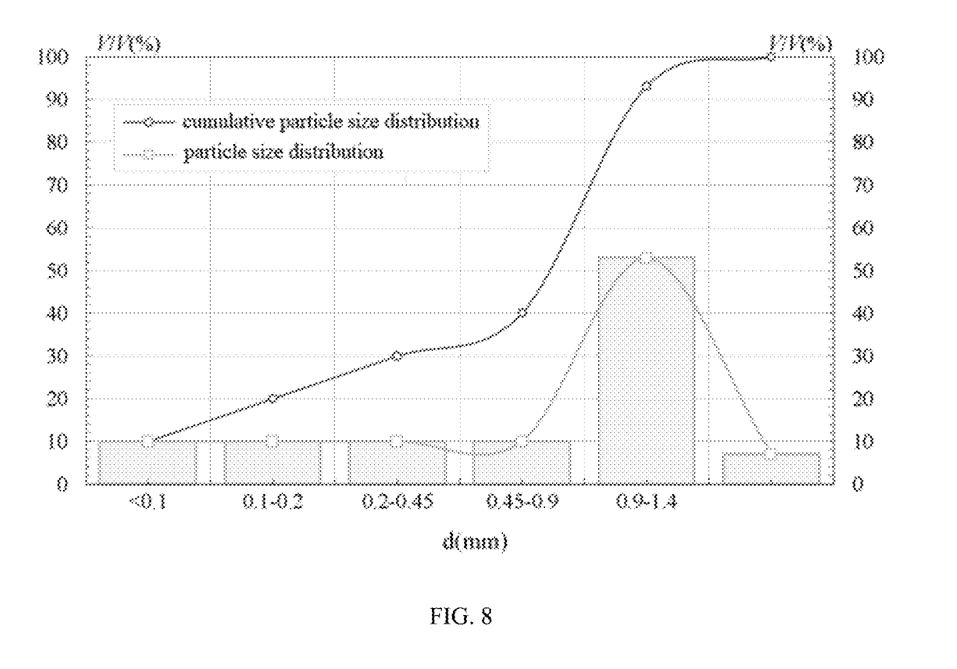
FIG. 8 is a schematic diagram showing the particle size distribution curve and cumulative particle size distribution curve of the particles according to Comparative Example 2.

The fracture widths and test method in Comparative Example 2 are the same as those in Embodiment 4. The difference is as follows: in Comparative Example 2, the weight ratio of level A-F lost circulation materials is set as 10:10:10:10:53:7, and the level A-F lost circulation materials are mixed to form the bridging lost circulation material D2. FIG. 8 is a schematic diagram showing the particle size distribution curve and cumulative particle size distribution curve of the lost circulation material D2. According to the cumulative distribution curve of the lost circulation material and the particle size distribution function, the characteristic particle sizes D10, D50 and D90 of the lost circulation material are calculated as 0.1, 1.05 and 1.36, respectively, which are not in the expected range.

Comparative Example 3

Figure 9:
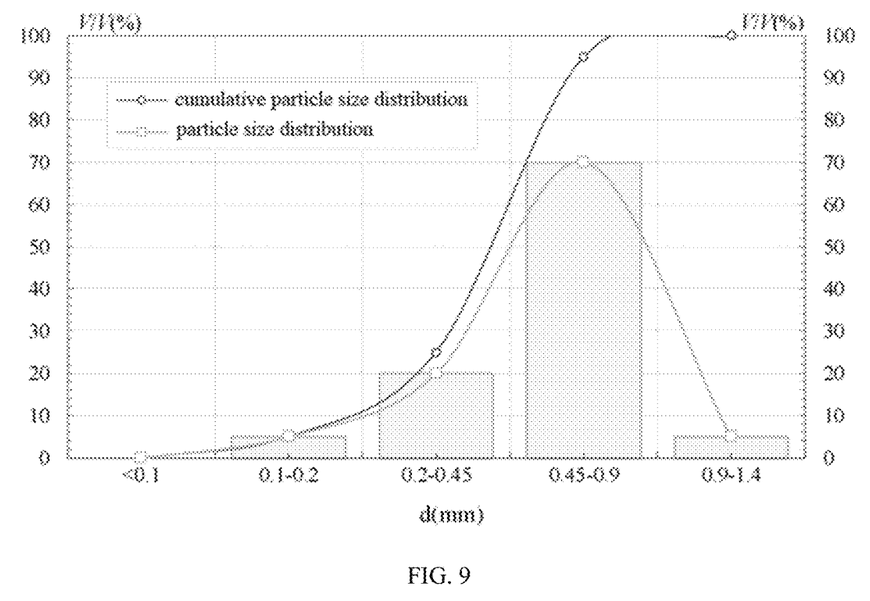
FIG. 9 is a schematic diagram showing the particle size distribution curve and cumulative particle size distribution curve of the particles according to Comparative Example 3.

The fracture widths and test method in Comparative Example 3 are the same as those in Embodiment 4. The difference is as follows: in Comparative Example 3, the weight ratio of level B-E lost circulation materials is set as 5:20:70:5, and the level B-E lost circulation materials are mixed to form the bridging lost circulation material D3. FIG. 9 is a schematic diagram showing the particle size distribution curve and cumulative particle size distribution curve of the lost circulation material D3. According to the cumulative distribution curve of the lost circulation material and the particle size distribution function, the characteristic particle sizes D10, D50 and D90 of the lost circulation material are calculated as 0.3, 0.59 and 1.36, respectively, which are not in the expected range.

Comparative Example 4

Figure 10:
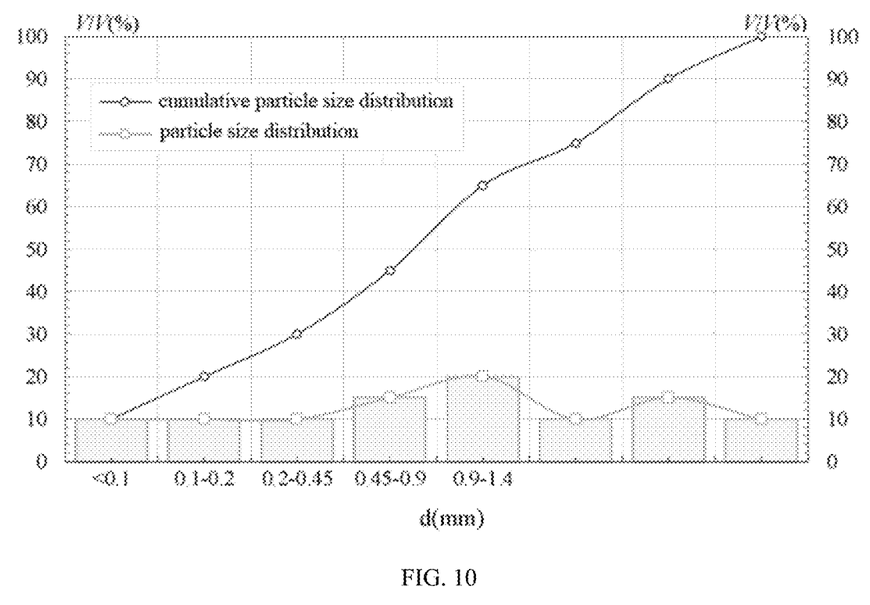
FIG. 10 is a schematic diagram showing the particle size distribution curve and cumulative particle size distribution curve of the particles according to Comparative Example 4.

The fracture widths and test method in Comparative Example 4 are the same as those in Embodiment 4. The difference is as follows: in Comparative Example 4, the weight ratio of level A-G lost circulation materials is set as 10:10:10:15:20:10:15:10, and the level A-G lost circulation materials are mixed to form the bridging lost circulation material D4. FIG. 10 is a schematic diagram showing the particle size distribution curve and cumulative particle size distribution curve of the lost circulation material D4. According to the cumulative distribution curve of the lost circulation material and the particle size distribution function, the characteristic particle sizes D10, D50 and D90 of the lost circulation material are calculated as 0.1, 1.06 and 2, respectively, which are not in the expected range.

The specific test method is as follows.

200 g of prepared lost circulation material is poured into 2000 mL of base slurry to obtain the slurry sample for lost circulation test. After stirring for 10 minutes, the slurry sample is poured into the tank of the lost circulation simulator, the cover of the lost circulation simulator is tightly screwed to seal the tank. An air compressor is used for pressurization with a controllable pressurization speed. The final pressure reaches 7 MPa under the pressurization speed of 1 MPa per 5 minutes, and the final pressure is maintained for 30 minutes. During this period, the accumulated leakage liquid at the fracture outlet is observed and recorded. At the end of the test, the air compressor is shut down, the pressure is released, and the combined plate with a fracture is dismantled to observe the plugging depth of the lost circulation material to the fracture and measure the plugging section length. The test results are shown in Table 2.

TABLE 2

| | Fracture Width | | Particle Size Distribution | | | Design Index Particle Size-Fracture Width Ratio R | Relative Span S | Plugging Effect | | Length of Plugging Section (cm) |
|---|---|---|---|---|---|---|---|---|---|---|
| Serial Number | $W_i$ (mm) | $W_o$ (mm) | D10 (mm) | D50 (mm) | D90 (mm) | | | Leakage Volume (mL) | Depth (cm) | |
| Embodiment 1 | 3 | 2 | 0.15 | 0.69 | 1.59 | 0.53 | 2.1 | 60 | 19 | 5.8 |
| Embodiment 2 | 3 | 2 | 0.2 | 0.53 | 1.89 | 0.63 | 3.2 | 35 | 15 | 4.2 |
| Embodiment 3 | 3 | 2 | 0.1 | 1.33 | 2.1 | 0.7 | 1.5 | 95 | 11 | 7.5 |
| Embodiment 4 | 2 | 1 | 0.15 | 0.35 | 1 | 0.5 | 2.4 | 50 | 20 | 5.6 |
| Embodiment 5 | 2 | 1 | 0.2 | 0.62 | 1.22 | 0.61 | 1.64 | 80 | 16 | 8.5 |
| Embodiment 6 | 2 | 1 | 0.1 | 0.70 | 1.36 | 0.68 | 1.8 | 115 | 13 | 10.2 |
| Comparative Example 1 | 2 | 1 | 0.1 | 0.44 | 0.9 | 0.45 | 1.8 | 2000 | No interlayer formed | No interlayer formed |
| Comparative Example 2 | 2 | 1 | 0.1 | 1.05 | 1.36 | 0.68 | 1.2 | 1080 | 13 | 13 |
| Comparative Example 3 | 2 | 1 | 0.3 | 0.59 | 1.36 | 0.68 | 1.8 | 850 | 13 | 13 |
| Comparative Example 4 | 2 | 1 | 0.1 | 1.06 | 2 | 1 | 1.8 | 75 | Sealing door | 2 |

From the above Embodiments 1-6, Comparative Examples 1-4 and the data in Table 2, the following are obtained.

According to the design method of particle size distribution of particulate bridging lost circulation material for fractured leakage, the bridging lost circulation materials S1-S6 are designed to smoothly enter into the fracture to bridge and fill in the fracture, resulting in a small amount of leakage fluid, a dense sealing bridging plugging interlayer, and a good plugging effect on fractures with different widths.

In particular, for a fracture with an inlet of 3 mm, as long as the characteristic particle size D90 of the lost circulation material is less than 2.1 mm, it can enter into the fracture and the situation of "sealing door" of the fracture caused by the lost circulation material can be effectively avoided; the relative span S of the particle size distribution is larger than 1.5, and with the increase of span S, the leakage volume during the plugging process is significantly reduced. Similarly, for a fracture with an inlet of 2 mm, as long as the particle size distribution of the lost circulation material meets the range specified by the design method of the present invention, the lost circulation material can form a stable and dense plugging interlayer in the fracture.

For Comparative Example 1, the bridging lost circulation material D1 cannot form the plugging interlayer in the experimental fracture, mainly because the characteristic particle size D90 of the particle size distribution of the lost circulation material is too small. Thus, although the lost circulation material can enter into the fracture, it will invade deeply, resulting in great loss of the lost circulation fluid, and therefore, the plugging interlayer cannot be formed within the length of the experimental fracture.

For Comparative Example 2, the ratio of the characteristic particle size D90 of the particle size distribution of the bridging lost circulation material D2 to the fracture width is 0.68, which is lower than 0.71, but the relative span of the particle size distribution is too small, only 1.2. Although the lost circulation material can enter into the fracture to build a bridge, the content of the relatively fine particles in the lost circulation material is low, and therefore, the fracture cannot be fully filled, resulting in a large leakage volume in the plugging process.

For Comparative Example 3, the lost circulation material D3 can bridge and plug the fracture, but the leakage volume in the plugging process is large. This is because the characteristic particle size D10 of the particle size distribution of the lost circulation material D3 is about 0.2 mm, and the lost circulation material lacks the fine particles, and therefore, a dense plugging layer in the fracture cannot be formed.

For Comparative Example 4, the lost circulation material D4 cannot enter into the fracture, but accumulates outside the fracture inlet to form a "sealing door". This is because the ratio of the particle size to the fracture width is too large (larger than 0.71), which does not conform to the range of the present invention, and the large particles in the lost circulation material cannot enter into the fracture smoothly.

Therefore, the design method of particle size distribution of the particulate material of the present invention is applicable to the bridging lost circulation process of the fractured leakage formation, and meanwhile can meet the requirements of the material entering the fracture and forming the dense plugging interlayer in the fracture.

The above description does not limit the present invention in any form. The above embodiments are only used to describe the present invention rather than to limit the present invention. Those skilled in the art, can make changes or modifications to obtain the equivalent embodiments based on the technical content described above within the scope of the technical scheme of the present invention. However, any simple modification, equivalent change made to the above embodiments according to the technical essence of the invention without departing from the technical solution of the present invention shall fall within the scope of protection of the technical solution of the present invention.

What is claimed is:

1. A method of designing a particle size distribution of particulate bridging lost circulation materials for a fractured leakage, comprising the following steps:
   step S10: classifying the lost circulation materials according to a particle size;
   step S20: calculating an expected range of a characteristic particle size of the lost circulation materials according to a fracture width and particle size selection criteria; wherein the particle size selection criteria are as follows:

$$R = \frac{D90}{W_i} = 0.5 - 0.71$$

$$D10 = 0.1 - 0.2$$

$$S = \frac{D90 - D10}{D50} \geq 1.5$$

where, R is a ratio of the characteristic particle size to the fracture width; $W_i$ is the fracture width; S is a relative span of the particle size distribution; D10 is a sieving particle size corresponding to 10% on a cumulative distribution curve of the lost circulation materials; D50 is a sieving particle size corresponding to 50% on the cumulative distribution curve of the lost circulation materials; D90 is a sieving particle size corresponding to 90% on the cumulative distribution curve of the lost circulation materials;
   step S30: according to each level of the lost circulation materials after being classified in step S10, setting a relative percentage content $\omega_1$-$\omega_n$ of the each level of the lost circulation materials;
   step S40: using a particle size distribution function to fit a particle size distribution curve;
   step S50: calculating the characteristic particle size of the lost circulation materials according to the particle size distribution curve;
   step S60: determining whether the characteristic particle size calculated in step S50 conforms to the expected range of the characteristic particle size calculated in step S20, wherein, when the characteristic particle size calculated in step S50 conforms to the expected range of the characteristic particle size calculated in step S20, proceeding to step S70; when the characteristic particle size calculated in step S50 does not conform to the expected range of the characteristic particle size calculated in step S20, resetting the relative percentage content of the each level of the lost circulation materials, and repeating steps S20-S60 until the characteristic particle size calculated in step S50 conforms to the expected range of the characteristic particle size calculated in step S20; and
   step S70: finally generating the particle size distribution of the lost circulation materials conforming to the expected range of the characteristic particle size.

2. The method of designing the particle size distribution of the particulate bridging lost circulation materials for the fractured leakage according to claim 1, wherein, the step S10 of classifying the lost circulation materials according to the particle size is as follows:
   a lost circulation material with a particle size of less than 0.1 and a mesh number of larger than 150 of the lost circulation materials is classified as a first-level lost circulation material;
   a lost circulation material with a particle size of 0.1-0.2 and a mesh number of 80-150 of the lost circulation materials is classified as a second-level lost circulation material;
   a lost circulation material with a particle size of 0.2-0.45 and a mesh number of 40-80 of the lost circulation materials is classified as a third-level lost circulation material;
   a lost circulation material with a particle size of 0.45-0.9 and a mesh number of 20-40 of the lost circulation materials is classified as a fourth-level lost circulation material;
   a lost circulation material with a particle size of 0.9-1.4 and a mesh number of 14-20 of the lost circulation materials is classified as a fifth-level lost circulation material;
   a lost circulation material with a particle size of 1.4-1.6 and a mesh number of 12-14 of the lost circulation materials is classified as a sixth-level lost circulation material;
   a lost circulation material with a particle size of 1.6-2.0 and a mesh number of 10-12 of the lost circulation materials is classified as a seventh-level lost circulation material;
   a lost circulation material with a particle size of 2.0-2.5 and a mesh number of 8-10 of the lost circulation materials is classified as an eighth-level lost circulation material; and
   a lost circulation material with a particle size of larger than 2.5 and a mesh number of less than 8 of the lost circulation materials is classified as a ninth-level lost circulation material.

3. The method of designing the particle size distribution of the particulate bridging lost circulation materials for the fractured leakage according to claim 1, wherein, a sum of the relative percentage content $\omega_1$-$\omega_n$ of the each level of the lost circulation materials in step S30 is 100.

* * * * *

UNITED STATES PATENT AND TRADEMARK OFFICE
CERTIFICATE OF CORRECTION

PATENT NO. : 11,397,839 B2
APPLICATION NO. : 16/897282
DATED : July 26, 2022
INVENTOR(S) : Gui Wang et al.

It is certified that error appears in the above-identified patent and that said Letters Patent is hereby corrected as shown below:

On the Title Page

Item [54] and in the Specification, Column 1 Line 1 The title should be:
--DESIGN METHOD OF PARTICLE SIZE DISTRIBUTION OF PARTICULATE BRIDGING LOST CIRCULATION MATERIALS FOR FRACTURED LEAKAGE--

Signed and Sealed this
Twenty-seventh Day of December, 2022

Katherine Kelly Vidal
*Director of the United States Patent and Trademark Office*